United States Patent
Harding et al.

(10) Patent No.: US 12,181,734 B2
(45) Date of Patent: Dec. 31, 2024

(54) MULTIPLE LAYER OPTICAL CELLS

(71) Applicant: FLEXENABLE LIMITED, Cambridge (GB)

(72) Inventors: James Harding, Cambridge (GB); William Reeves, Cambridge (GB)

(73) Assignee: FLEXENABLE TECHNOLOGY LIMITED, Cambridge (GB)

( * ) Notice: Subject to any disclaimer, the term of this patent is extended or adjusted under 35 U.S.C. 154(b) by 66 days.

(21) Appl. No.: 17/631,442

(22) PCT Filed: Jul. 30, 2020

(86) PCT No.: PCT/EP2020/071580
§ 371 (c)(1),
(2) Date: Jan. 28, 2022

(87) PCT Pub. No.: WO2021/019048
PCT Pub. Date: Feb. 4, 2021

(65) Prior Publication Data
US 2022/0276508 A1   Sep. 1, 2022

(30) Foreign Application Priority Data
Jul. 31, 2019   (GB) ...................................... 1910933

(51) Int. Cl.
*G02C 7/08*   (2006.01)
*G02F 1/29*   (2006.01)

(52) U.S. Cl.
CPC ............. *G02C 7/083* (2013.01); *G02F 1/294* (2021.01); *G02C 2202/16* (2013.01); *G02F 2202/28* (2013.01)

(58) Field of Classification Search
None
See application file for complete search history.

(56) References Cited

U.S. PATENT DOCUMENTS

| 2009/0033587 A1* | 2/2009 | Fricke | G02F 1/1347 345/1.3 |
| 2011/0128260 A1 | 6/2011 | Huitema et al. | |
| 2016/0111685 A1* | 4/2016 | Naijo | H10K 50/856 257/40 |
| 2016/0282661 A1 | 9/2016 | Nam | |
| 2017/0037173 A1* | 2/2017 | Saha | C09K 19/56 |

(Continued)

FOREIGN PATENT DOCUMENTS

| CN | 102695732 A |   | 9/2012 |   |
| EP | 3499299 A1 | * | 6/2019 | ........... G02B 5/1895 |
| JP | 2019028448 A | * | 2/2019 | ....... G02F 1/133308 |

OTHER PUBLICATIONS

English Machine Translation of Imaoku, JP 2019 028 448 (Year: 2023).*

(Continued)

*Primary Examiner* — Donald L Raleigh
(74) *Attorney, Agent, or Firm* — Tarolli, Sundheim, Covell & Tummino LLP (57) ABSTRACT

We disclose an optical device comprising an optical stack. The optical stack comprises a first substrate layer, a second substrate layer, and an optical medium located between the first and second substrate layers. The optical stack is bent such that a second portion of the optical stack extends behind a first portion of the optical stack.

24 Claims, 7 Drawing Sheets

(56) References Cited

U.S. PATENT DOCUMENTS

2017/0293194 A1 10/2017 Hou
2018/0088380 A1 3/2018 Oka et al.

OTHER PUBLICATIONS

International Search Report and Written Opinion for corresponding PCT Patent Application No. PCT/EP2020/071580 dated Sep. 29, 2020.
Combined Search and Examination Report for corresponding GB Patent Application No. 1910933.9 dated Jan. 23, 2020.
CN Office Action for corresponding CN Application No. 202080054510.0, dated Mar. 5, 2024, 11 pgs.

* cited by examiner

MULTIPLE LAYER OPTICAL CELLS

TECHNICAL FIELD OF THE DISCLOSURE

This disclosure relates to optical devices, particularly but not exclusively, the disclosure relates to multiple layered liquid crystal optical devices manufactured using a single monolithic process.

BACKGROUND TO THE DISCLOSURE

Liquid crystal optics uses multiple stacked liquid crystal cells, the power of these optics can be increased by further stacking a greater number of cells.

Stacking multiple cells on top of each other requires multiple connections, each of which add cost, complexity, take up space, and reduce yield.

Figure 1:
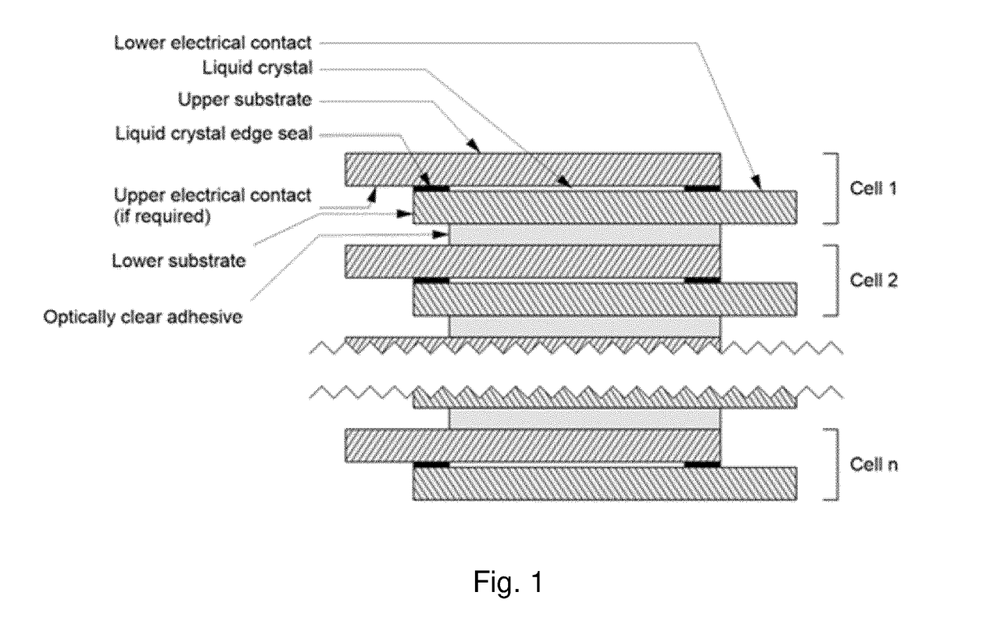
FIG. 1 shows a schematic cross section of an optical device stack according to the state-of-the-art.

FIG. 1 illustrates a state-of-the-art liquid crystal optical device, which includes n liquid crystal cells stacked on top of each other. Multiple connections are used to connect to each optical cell and adhesive is used between each of the optical cells in the stack of liquid crystal cells.

One current solution has been to introduce vias through the substrate layers to allow connections to optical cells; however this also adds further complexity and cost.

SUMMARY

It is an object of the present disclosure to provide multiple layered optical cells, which can be manufactured using a single monolithic process.

The devices of the disclosure are advantageous over state-of-the-art devices for the following reasons:

- Instead of creating multiple cells and separate connections the invention is to create a longer single cell and fold it back on itself;
- This allows a single process to create multiple complete cells;
- It also allows very complex stacks to be created in a single monolithic layer.
- Small angles can be added to the folds, which allows a single industrial process to be used to create multiple optics designs;
- Different glue patterns can isolate cells for different form factors, shapes and designs. Adhesive lines can be used to separate individual optical cells, or alternatively a seal may be applied only around the perimeter (thus reducing the potential for glue intermixing);
- A single connection can be made to large numbers of stacked cells;
- The approach scales to as many layers as required;
- The optical devices may be used in LC displays, optics, or sensors and may be used in Virtual Reality (VR) displays.

According to a first aspect of the present disclosure there is provided an optical device, the device comprising: an optical stack, wherein the optical stack comprises: a first substrate layer; a second substrate layer; an optical medium located between the first and second substrate layers; wherein the optical stack is bent such that a second portion of the optical stack extends behind a first portion of the optical stack. This provides a multiple layered optical cell device, using a single process. The optical device may be used in optics, displays, or sensors.

The optical medium may be liquid crystal layer.

The first portion of the optical stack may be substantially parallel to the second portion of the optical stack.

Each portion of the optical stack may form an optical cell. The optical cell may be a liquid crystal cell or an organic photodiode (OPD).

Each of the first substrate layer and the second substrate layer may comprise a single continuous substrate layer forming both the first portion and the second portion of the optical stack. In other words, each substrate layer may extend through all of the optical cells in the optical device.

The first substrate layer may be spaced from the second substrate layer in a first dimension and the first portion of the optical stack may be spaced from the second portion of the optical stack in the first dimension. In other words, within each optical cell, the first substrate layer is on top of the second substrate layer. When the device is bent, the optical cells may then be stacked on top of each other.

The first substrate layer may comprise an upper substrate layer of the first portion of the stack and a lower substrate layer of the second portion of the stack; and the second substrate layer may comprise the lower substrate layer of the first portion of the stack and the upper substrate layer of the second portion of the stack. In other words the first substrate layer may form the top layer of a first optical cell and the bottom layer of a second optical cell, and the second substrate layer may form the bottom layer of the first optical cell and the top layer of the second optical cell. A single substrate layer may be a substrate layer for two optical cells, but may be a top layer for one optical cell and a bottom layer for another optical cell.

The optical stack may be bent at an angle of approximately 180°. This allows optical cells to be substantially flat against each other.

The optical device may further comprise electrical connections coupled with the first substrate layer and the second substrate layer, and the electrical connections may be located on a single side of the optical stack. In other words, when the optical device stack is bent, the electrical connections may be to a single optical cell. This reduces the amount of electrical connections required for the optical device.

Alternatively, the optical device may further comprise electrical connections coupled with the first substrate layer and the second substrate layer, and the electrical connections may be provided to each portion of the optical device stack. In other words, electrical connections may be provided to each optical cell. This protects the electrical connections from cracking when the optical device stack is bent.

The electrical connections may comprise Aluminium. Alternatively, the electrical connections may comprise any metals or alloys suitable for sputtering or similar types of deposition, such as Molybdenum, Nickel, Silver, Gold and alloys thereof. The electrical connections may comprise Indium Titanium Oxide (ITO). Aluminium—or the other example metals and alloys—may be used as they are more ductile than ITO, and therefore protect the electrical connections from cracking when the optical device stack is bent. Alternatively, screen printable conductive silver tracking may be used for the electrical connections. This may be applied outside the optical cell in a similar manner to conventional touch screen routing. Multiple "touch sensor like" screen printable conductive silver tracks may be formed on one edge of the folded cell stack.

Alternatively or additionally, reinforcing, high conductivity tracking or routing may be formed along the length of the optical device stack when unfolded. This tracking may comprise metal or may comprise another conductive material. This is advantageous when there are many cells within the optical device stack (a long strip) and the connections are to be made only on the short edge. This tracking improves the electrical connection, as the conductivity of the ITO alone may not be sufficient to switch all the cells—especially the ones at the end of the strip. In this case. Preferably, the conductive material may be ductile in order to withstand the folds at each optical cell boundary.

The optical device may further comprise one or more intermediate transparent layers between adjacent portions of the optical stack.

The intermediate transparent layer may be an adhesive layer. The adhesive layer ensures that the optical device retains the appropriate alignment, removes any unwanted airgaps from the final optical stack, and that adjacent optical cells are separated by the required distance. The adhesive may be a liquid adhesive or may be a sheet adhesive.

The intermediate layer may be located between a first portion of the second substrate layer and a second portion of the second substrate layer. In other words, the intermediate layer may be located between a bottom layer of a first optical cell and a top layer of a second optical cell. The optical device stack may be bent such that the intermediate layer is located between adjacent portions of one substrate layer.

The optical device stack may be bent around the intermediate layer. The intermediate layer may determine the rate of curvature of the optical device stack. The thickness of the optical device and distance between adjacent optical cells may be dependent on the thickness of the intermediate layer, therefore the thickness of the intermediate layer may be varied to alter the properties of the optical device.

The intermediate transparent layer may have a refractive index substantially the same as a refractive index of the optical medium. The intermediate layer may comprise a non-birefringent material. Therefore, the intermediate layer does not alter the optical properties of the optical device and minimises reflection within the device.

Additionally the optical device stack may comprise further adhesive forming a glue frame or seal. The glue frame may be configured to isolate individual optical cells, in order to enhance mechanical robustness.

Alternatively, the glue frame may be configured to allow the cell gap to continue over the bend. The glue seal may be formed only around the periphery of the entire optical device stack when unfolded. This is less complex to manufacture and reduces the fragility of the optical device. Only having the glue frame around the perimeter of the optical device stack means that a less rigid material is situated at the bend, allowing narrower bezels.

The optical device may comprise at least four optical cells, each optical cell may be parallel to each other optical cell, and each optical cell may extend behind an adjacent optical cell. Alternatively, the optical device may have less than four optical cells or more than four optical cells. The number of optical cells may be chosen dependent upon user requirements; however any number of optical cells may be manufactured in a single process. The optical medium within each optical cell may be contained separately or may be a single layer of continuous optical medium.

The optical stack may be bent such that it has a corrugated shape. The corrugated shape may also be described as a concertina shape. The corrugated shape may be a series of alternating parallel ridges and grooves, or alternating folds in opposite directions. The concertina shape ensure that the stress in the cell is reset every time the optical stack has a bend in one direction and then in the other direction. The alternating direction of curvature ensures that neither substrate is stretched substantially with regards to the other substrate, therefore preventing wrinkling.

Alternatively, the optical stack may be bent such that it has a spiral shape, however the constant direction of curvature would mean that the "outer substrate" would be stretched relative to the inner and may wrinkle.

Each portion of the optical stack may form an optical lens. The stack optical lens may form a more powerful optical lens. The number of optical cells or portions may be altered to alter the total power of the optical lens.

The substrate layers may comprise a plastic material. The substrate may comprise a flexible material. This allows for the whole optical device stack to be flexible and to be bent to form the optical device. This would be less feasible using glass, as used in state-of-the-art devices. The substrate layers may comprise TAC film, Polyimide (PI) or Cyclo Olefin Polymer (COP). The substrate layers may also comprise other plastic materials not listed. TAC has the same birefringence as glass but is much thinner, meaning overall better performance than glass optically (as well as being thinner, lighter, and shatterproof). TAC is flexible and therefore allows the radius of curvature of the bends within the optical device to be minimal. Alternatively, the substrate layers may comprise any flexible substrate material.

The optical medium may comprise aligned domains. This alignment of the domains may be altered to change the optical properties of each portion of the optical device stack and of the optical device as a whole. The domains may comprise liquid crystals. The liquid crystal (LC) alignment direction may be configured to be different for each optical cell. Each optical cell would be exposed differently by masking off all but the current area to be exposed, whilst the optical device stack is unfolded. No additional inter-cell seals would be required to implement this.

Each portion of the optical device stack may be square when folded. Alternatively, each portion of the optical device stack may be rectangular, circular, or oval when folded. The optical cells within the optical device may have a square, rectangular, circular, oval, or other shape. The optical cells may have a substantially circular, oval, or other shape comprising at least one flat edge to provide a region for bending the optical stack.

According to a further aspect of the present disclosure, there is provided an eyewear apparatus comprising two optical devices as described above. The domains of a first optical device may be aligned in a first direction and the domains of a second optical device may be aligned in a second direction. This allows each eye of the eyewear apparatus to have different optical properties, which can be used in 3-dimensional glasses.

According to a further aspect of the present disclosure, there is provided a method of manufacturing an optical device, the method comprising: forming an optical stack, wherein the optical stack comprises: a first substrate layer, a second substrate layer, an optical medium located between the first and second substrate layers; and bending the optical stack such that a second portion of the optical stack extends behind a first portion of the optical stack. The method allows the manufacture of multiple optical cells in a stack using a single manufacturing process. This reduces complexity of manufacturing and reduces cost of manufacturing.

Prior to bending the optical stack, the method may further comprise: using a photolithography mask to align the optical medium within the first portion of the optical stack in a first direction, and using a photolithography mask to align the optical medium within the second portion of the optical stack in a second direction. This allows the domains within the optical medium to be aligned, and all optical cells may be aligned in a single step.

Bending the optical device stack may comprise using a rod to bend around and/or inserting spacers between adjacent layers. A tool similar to a sheet metal bending machine may perform the first bend. Preferably, this may be performed in a vacuum if sheet adhesive or liquid adhesive is used to adhere the cells on either side of the fold. Once the first fold is performed then the next fold may be performed in the opposite direction. The initial folds may be configured to be "loose" or less tight, and then a final press may be performed to obtain the final cell stack.

Alternatively, the optical device stack may be rolled up into a spiral, and then pressed or squashed flat.

BRIEF DESCRIPTION OF THE DRAWINGS

Some preferred embodiments of the disclosure will now be described by way of example only and with reference to the accompanying drawings, in which:

FIG. 9 FIG. 12 shows a plan view of electrical routing or tracking that is used for the electrical connections, instead of the electrical connections, or in addition to the electrical connections of previous embodiments.

DETAILED DESCRIPTION OF THE PREFERRED EMBODIMENTS

Embodiments will now be described by way of example only.

Figure 2:
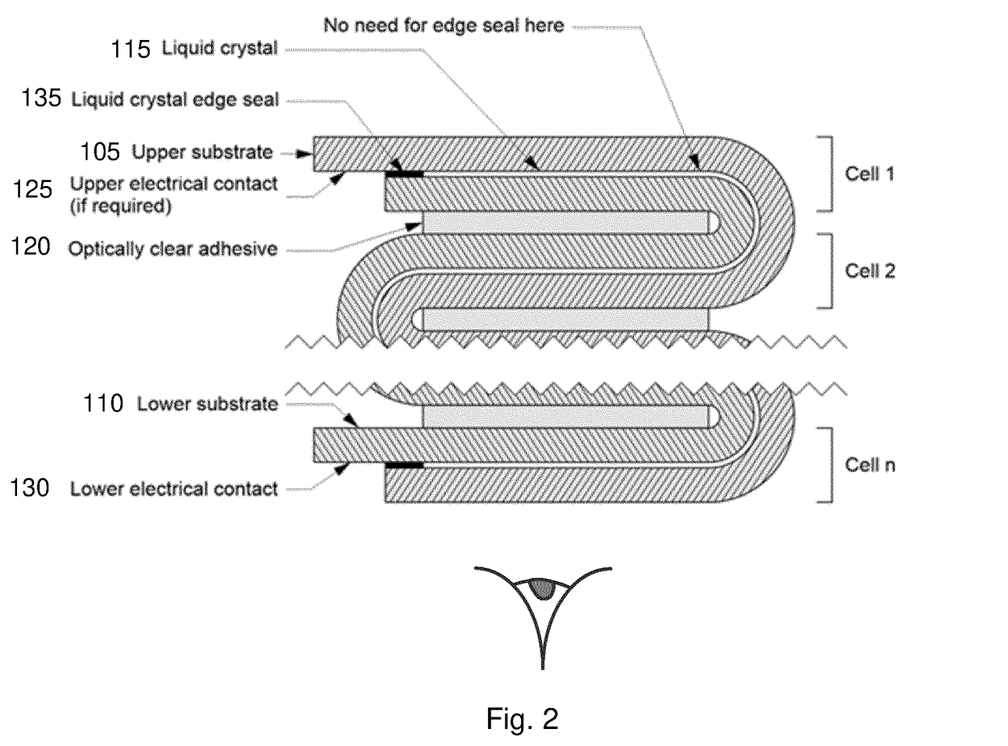
FIG. 2 shows a schematic cross section of an optical device stack according to an embodiment of the present disclosure.

FIG. 2 shows a schematic cross section of an optical device stack according to an embodiment of the disclosure.

The optical device stack includes two substrate layers: a first substrate layer 105 and a second substrate layer 110. The second substrate layer 110 is located parallel to the first substrate layer 105. A liquid crystal (LC) layer 115 extends between the two substrate layers 105, 110. In this embodiment, a liquid crystal layer is used although this could be a layer of a different optical medium, such as an organic photodiode (OPD).

The optical device stack is bent such that it has a concertina or a corrugated shape, where part of the optical device stack on one side of the bend extends behind part of the optical device stack on another side of the bend. For example, a single bend would form a C-shape, two bends could be used to form an S-shape or three of more bends could be used to form a corrugated shape as shown in FIG. 2.

The optical device stack is a single continuous stack that extends around each of the bends. Therefore, a first portion of the optical device stack that is laterally adjacent to a second portion of the optical device stack when flat, will be adjacent and on top of the second portion of the optical device stack when bent. The first substrate layer 105 will form the top substrate layer of Cell 1 and the bottom substrate layer of Cell 2. The second substrate layer 110 will form the bottom substrate layer of Cell 1 and the top substrate layer of Cell 2.

Each portion of the optical device stack can be defined as a part of the optical device stack located between two adjacent bends of the optical device stack. Each portion of the optical device stack includes a portion of the first substrate 105, a portion of the second substrate 110, and a portion of the optical medium 115 and therefore forms an optical cell. In this embodiment shown in FIG. 2, the optical cell is a liquid crystal cell however this may also be an organic photodiode (OPD).

A liquid crystal edge seal 135 is located between the first substrate layer 105 and the second substrate layer 110, however is only required at the end optical cells (Cell 1 and Cell n).

In this embodiment, the first substrate layer 105 and the second substrate layer 110 are Cellulose triacetate (TAC) film. The TAC film can be replaced with any suitably flexible substrate material. For some applications, choosing a non-birefringent material such as Polyimide (PI) or Cyclo Olefin Polymer (COP) is preferred. TAC has the same birefringence as glass but is much thinner, meaning overall better performance than glass optically (as well as being thinner, lighter, and shatterproof). TAC is flexible and therefore allows the radius of curvature of the bends within the optical device to be minimal.

When bent, adjacent portions (optical cells) of the optical device stack are separated by an optically clear adhesive (OCA) 120. The thickness of the substrate layers 105, 110 and the thickness of the OCA 120 determine the rate of curvature of the bend between adjacent portions of the optical device stack, and determine the vertical separation between adjacent portions of the optical device stack. The adhesive 120 must be optically clear to allow light to pass between adjacent portions of the optical device stack. As the adhesive 120 is not used across the whole width of each portion of the optical device stack (i.e. is only used up to the bend), this uses less adhesive to form the optical device stack than shown in FIG. 1.

A first electrode 125 is formed on a first end of the first substrate layer 105 and a second electrode 130 is formed on a second end of the second substrate layer 110. In this embodiment, the electrodes 125, 130 are Indium tin oxide (ITO) electrodes patterned on the substrate layers 105, 110. In other embodiments, Aluminium (or other metals and alloys—as described earlier) may be used to reinforce the electrodes 105, 110, as this is more ductile and withstands bending.

Both electrodes 125, 130 may be formed on a single side of the optical device stack which allows the optical device to be more easily connected. Furthermore, only a single pair of electrodes are required for all the optical cells within the optical device stack, therefore reducing the amount of contacts required. Alternatively, individual electrode contacts for each optical cell may be formed on a single side and edge of the optical stack, as shown in FIG. 4, or reinforcing, high conductivity tracking or routing (not shown) may be formed along the length of the optical device stack when unfolded.

Figure 3:
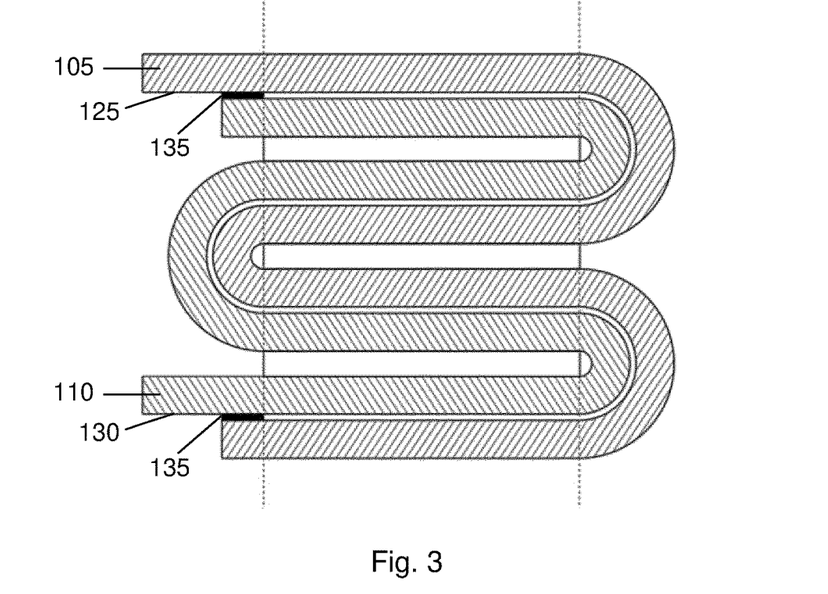
FIG. 3 shows a schematic cross section of an optical device stack according to an embodiment of the present disclosure, in which the optical cells are shown.

FIG. 3 shows a schematic cross section of an optical device stack according to an embodiment of the present disclosure, in which the optical cells are shown. The area of the optical stack between the lines A and A' corresponds to the area of the optical cells. In this optical cell region, the optical device stack is flat and each optical cell is parallel to each of the optical cells above and below. Bending of the optical device is located outside the optical cells. Electrical connections 125, 130 and the liquid crystal edge seal 135 are located outside the area of the optical cells.

FIGS. 2 and 3 do not show the optical device to scale, but show schematically a cross section of the device. In a physical device, the area of the optical cell will be much greater than area used for bending and connection. In manufactured devices, the folds between optical cells will have an angle of 180 degrees. After bending the optical device stack, the device will be laminated flat, this could be done in a vacuum press. This ensures that the optical cells are all parallel to each other.

Figure 4:
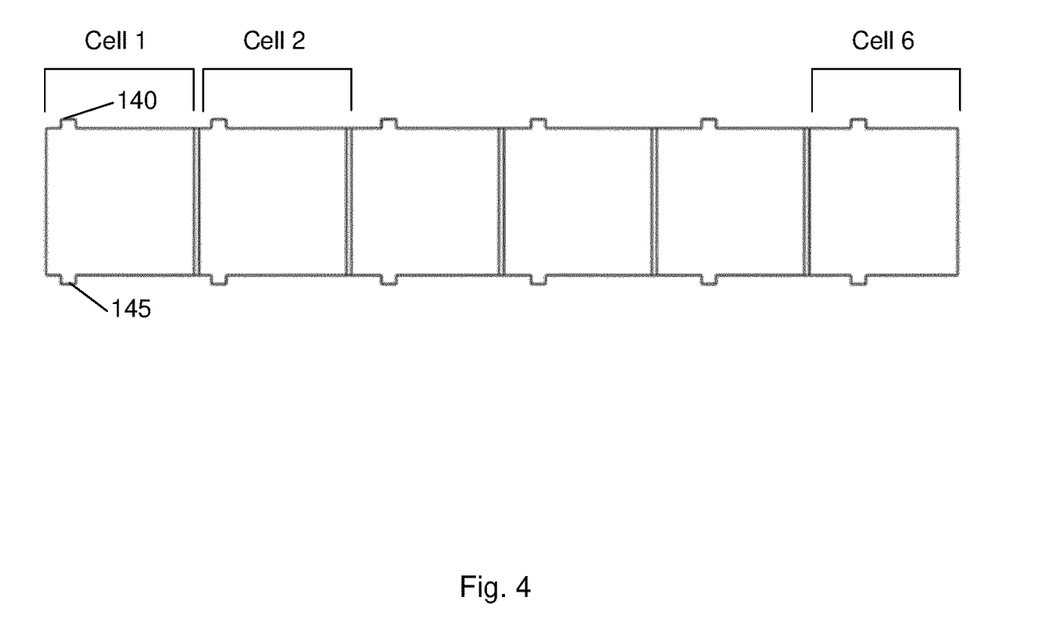
FIG. 4 shows a plan view of an optical device according to a first embodiment of the present disclosure, in which the optical device has electrical connections to each portion of the device stack and in which the optical device is shown prior to folding.

FIG. 4 shows a plan view of an optical device according to one embodiment of the present disclosure, in which the optical device has electrical connections to each portion of the device stack. This figure shows the flat pattern of the optical device prior to folding, where portions of the optical device stack are laterally spaced from each other.

In this embodiment, each optical cell has electrical connections 140, 145 on two sides of each optical cell. Electrodes 140 on one side of the optical device stack connect to the first substrate layer and electrodes 145 on the opposite side of the optical device stack connect to the second substrate layer. In contrast to the embodiment shown in FIGS. 2 and 3, the electrical connections 140, 145 are formed on the two sides of each optical cell that are perpendicular to the folds of the optical device stack. These electrodes 140, 145 can be used when there is a risk of the patterned ITO electrodes or metal routing cracking when bent. As there are discrete electrical connections for each optical cell, the electrical connections do not need to extend around the folds and do not have to bend themselves, and therefore are protected when the optical device stack is bent.

The electrical connections 140, 145 are staggered along the edges of each optical cell such that when the optical device stack is bent, they do not overlap and are laterally spaced from each other. This allows for easier connection. Contact can be made to the top and bottom substrate layers of each optical cell without electrodes 140, 145 cracking due to bending.

Figure 5A:
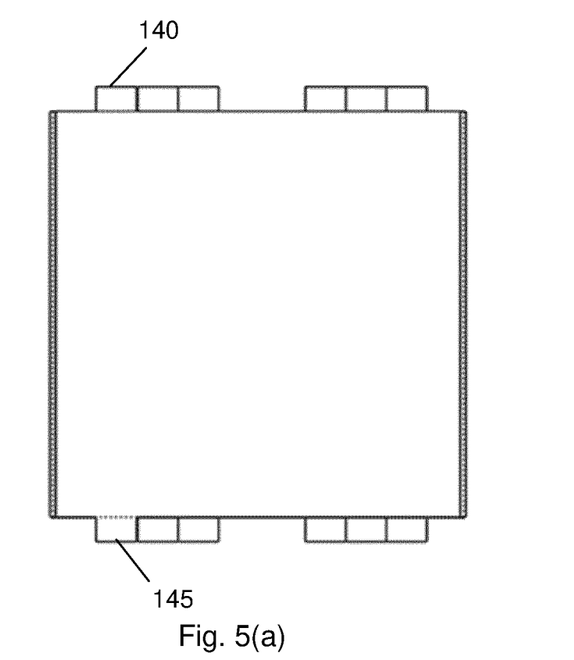
FIG. 5(a) shows a top view of an optical device according to a first embodiment of the present disclosure, in which the optical device has electrical connections to each portion of the device stack and in which the optical device is shown folded.

FIG. 5(*a*) shows a top view of an optical device according to a first embodiment of the present disclosure, in which the optical device has electrical connections to each portion of the device stack. This figure shows the optical device of FIG. 4 in which the optical device is shown folded. As shown in FIG. 4, the electrical connections along each side are staggered, such that when the optical device stack is bent, the electrical connections along each side are spaced from each other laterally.

Alternatively, along the top (or bottom) edge of the optical device stack, the electrical connections could also alternate between top and bottom contacts, or be at alternating ends of the edges. This means that all the contacts on one edge of the folded device will be facing in the same direction, rather than grouped as shown in FIG. 5(*a*).

Figure 5B:
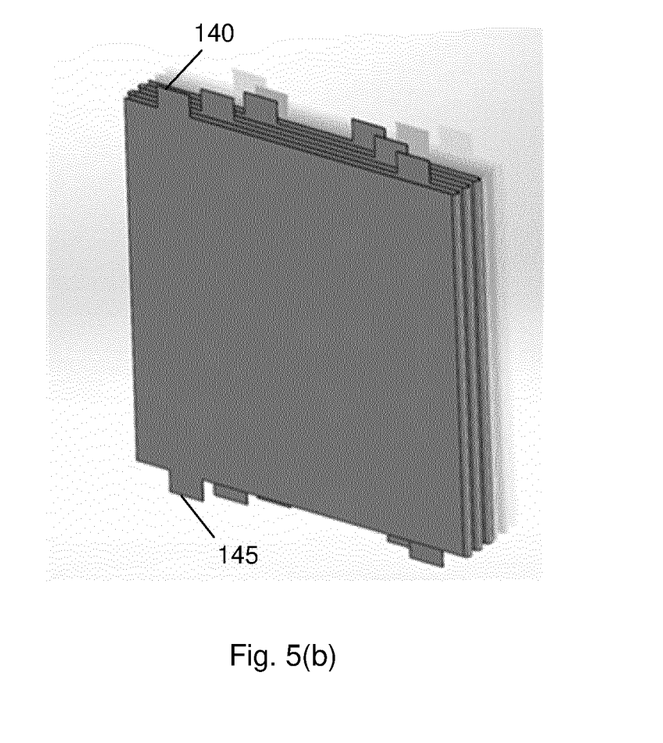
FIG. 5(b) shows a perspective view of an optical device according to a first embodiment of the present disclosure, in which the optical device has electrical connections to each portion of the device stack and in which the optical device is shown folded.

FIG. 5(*b*) shows a perspective view of an optical device according to a first embodiment of the present disclosure, in which the optical device has electrical connections to each portion of the device stack and in which the optical device is shown folded. This Figure shows the optical device of FIG. 5(*a*).

Figure 6:
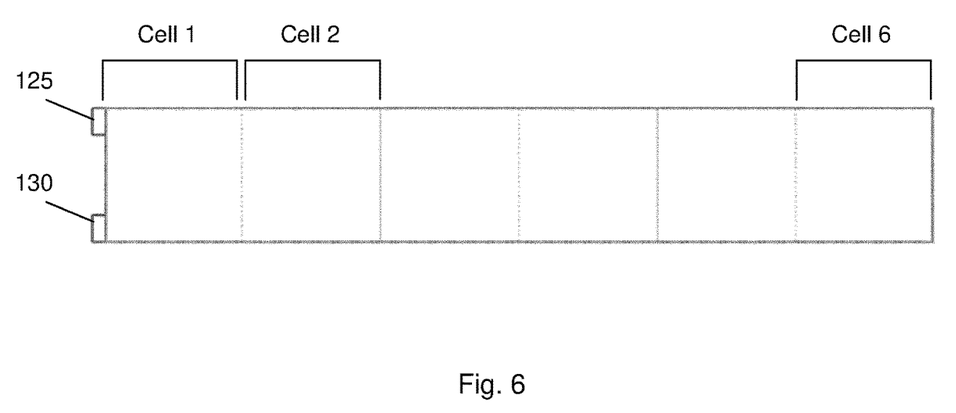
FIG. 6 shows a plan view of an optical device according to a further embodiment of the present disclosure, in which electrical connections are provided to a single portion of the device stack and in which the optical device is shown prior to folding.

FIG. 6 shows a plan view of an optical device according to a further embodiment of the present disclosure, in which electrical connections are provided to a single portion of the device stack and in which the optical device is shown prior to folding. In this embodiment, electrical connections 125, 130 are provided only to one optical cell, which is an end optical cell. This would be Cell 1 or Cell n as shown in FIG. 2. Each electrical connection 125, 130 extends through all the cells, through each fold of the device. This forms an "all switching at once" device.

Other numbers of connections may be present (e.g. one for each cell or any other number of connections) and the top plate contacts could be brought down to the bottom place to facilitate flex tail bonding with the use of z-axis conductive adhesive.

Figure 7:
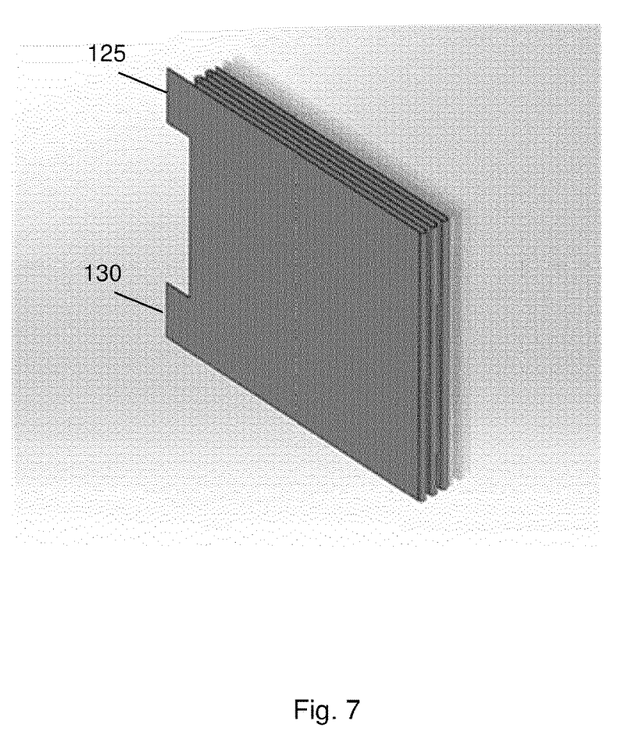
FIG. 7 shows a perspective view of an optical device according to a further embodiment of the present disclosure, in which the optical device has electrical connections to a single portion of the device stack and in which the optical device is shown folded.

FIG. 7 shows a perspective view of an optical device according to a further embodiment of the present disclosure, in which the optical device has electrical connections to a single portion of the device stack and in which the optical device is shown folded. This Figure shows the optical device of FIG. 6.

Figure 8:
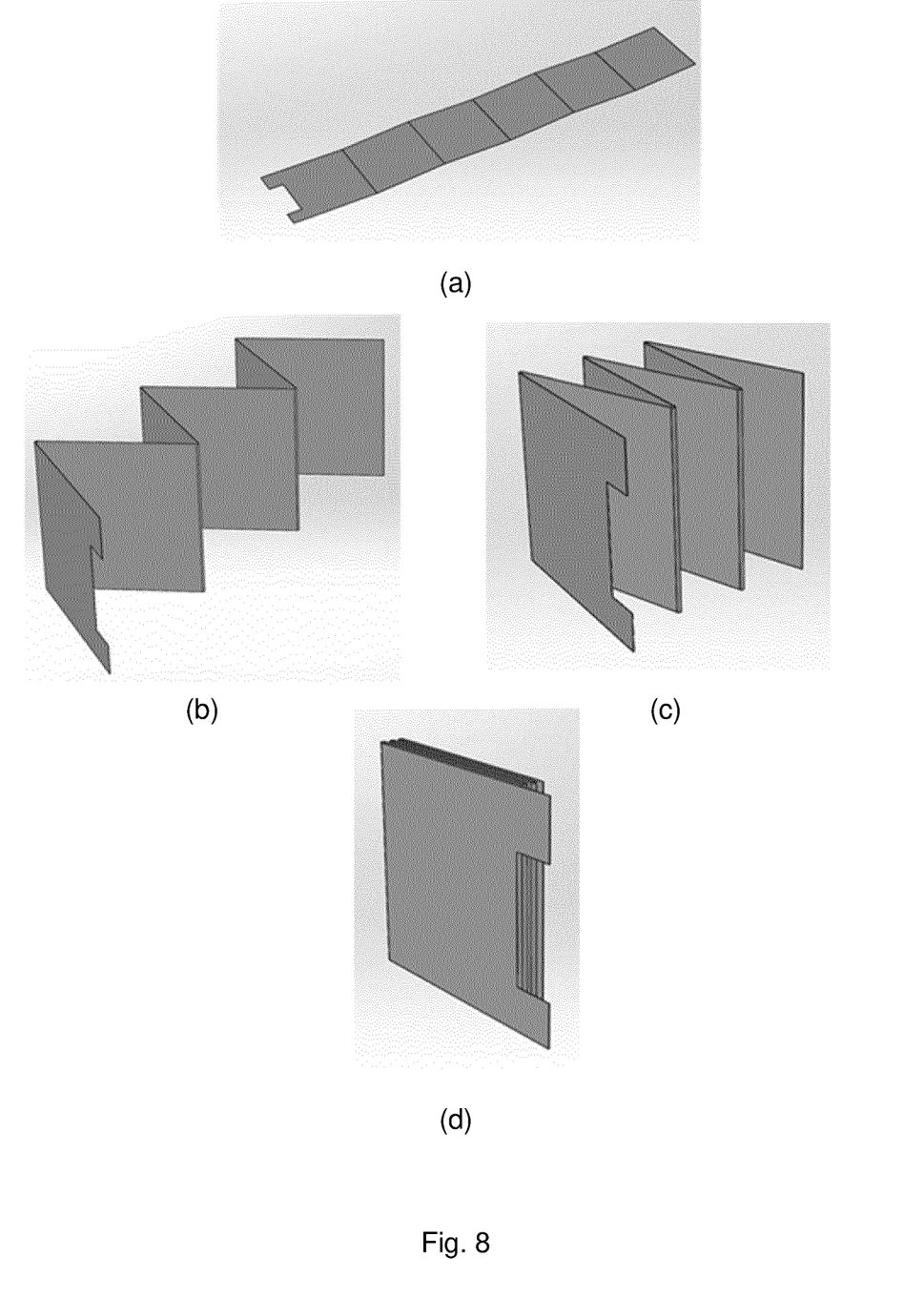
FIGS. 8(a) to 8(d) show perspective views of an optical device according to a further embodiment of the present disclosure. These show the optical device at four stages of the bending process during manufacture.

FIGS. 8(*a*) to 8(*d*) show perspective views of an optical device according to a further embodiment of the present disclosure. These show the optical device of FIGS. 6 and 7 at four stages of the bending process during manufacture.

Figure 9:
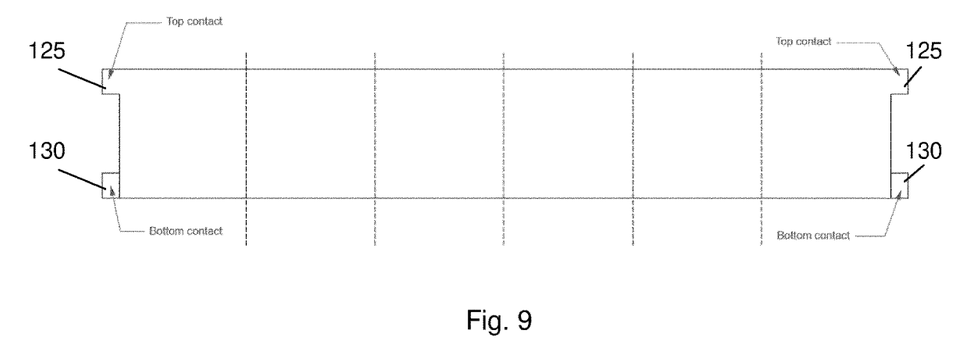

FIG. 9 illustrates a plan view of an optical device according to an embodiment of the present disclosure, in which the electrical connections are provided at both ends of the electrical device stack. This shows the optical devices of FIGS. 2 and 3, prior to folding.

Figure 10:
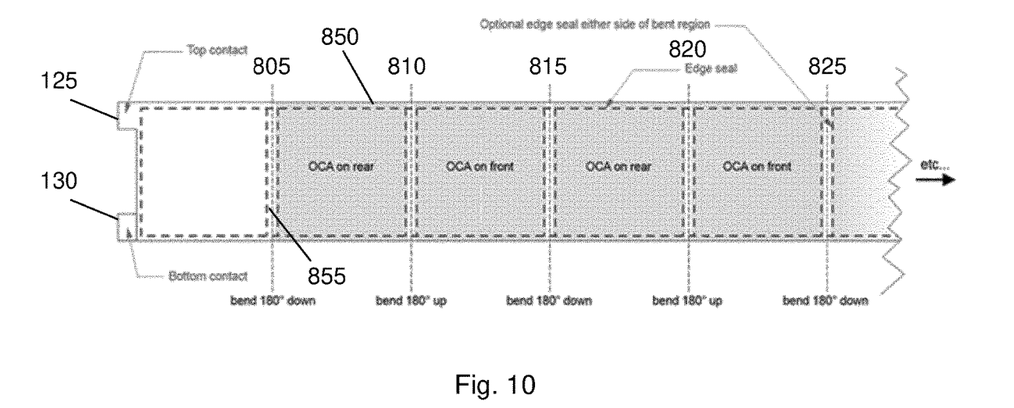

FIG. 10 shows a plan view of an optical device according to an embodiment of the present disclosure, in which the adhesive and folding points of the device are shown prior to folding. At points 805, 815, and 825, the optical device stack is folded down, to form a valley fold. At points 810 and 820 the optical device stack is folded up, to form a mountain fold. In this manner the optical device stack is folded to form a concertina or corrugated shape. This is then laminated flat so that each fold is 180°. Adhesive is applied to the top surface of alternate optical cells and the bottom surface of the other alternate optical cells (where adhesive has not been applied to the top surface) such that when the optical device is folded adhesive is provided between throughout the optical device. The edge seal prevents the LC from leaving the cell. In this embodiment, there is a rectangular edge seal 850 around the perimeter of the entire optical device stack, which contains all the optical cells. There is also shown a further edge seal 855 between adjacent optical cells, although some embodiments may only include the perimeter edge seal 850.

Figure 11:
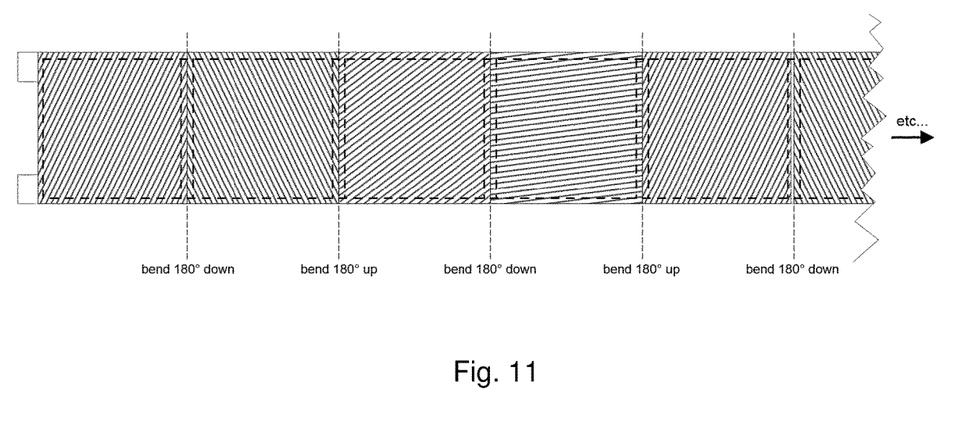

FIG. 11 shows a plan view of an optical device according to an embodiment of the present disclosure, in which the mask used for aligning the optical medium is shown prior to folding. The polarisation angle of the UV exposure is altered for each cell, and only one optical cell is exposed at a time using a mask. This allows each cell to have a different arbitrary liquid crystal alignment direction. This shows the embodiment of FIG. 6 or FIG. 9, although this method could be applied equally to any of the other embodiments shown.

Figure 12:
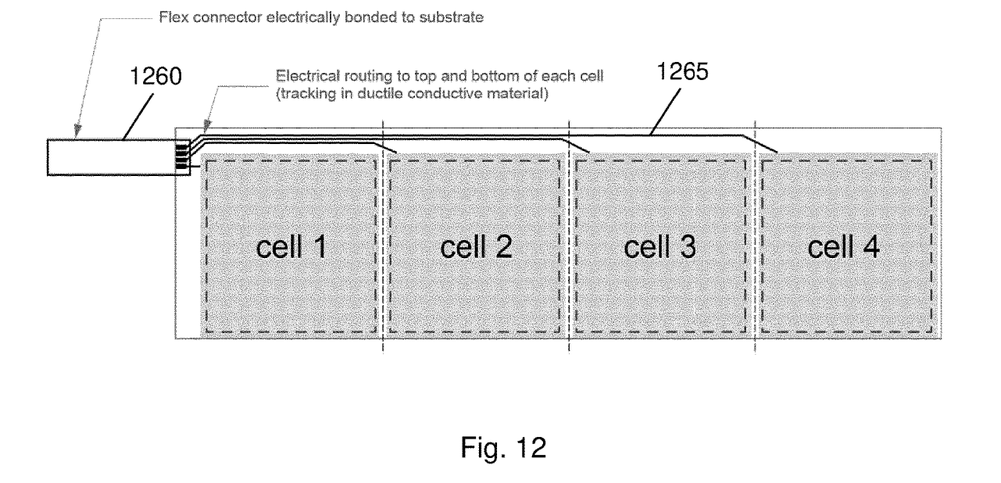

FIG. 12 shows a plan view of electrical routing or tracking that is used for the electrical connections, instead of the electrical connections, or in addition to the electrical connections of previous embodiments. This includes a flex connector 1260 electrically bonded to the substrate of the device stack, and electrical routing 1265 to the top and bottom of each optical cell. The conductive routing material 1265 could be reinforced or replaced with a more ductile material near the bends/folds of the optical device. The ITO/transparent conductor 1265 may also be patterned so that it specifically does not crack at the folds, leaving only the ductile connector in the region of the folds.

The skilled person will understand that in the preceding description and appended claims, positional terms such as 'above', 'overlap', 'under', 'lateral', 'vertical', etc. are made with reference to conceptual illustrations of an optical device, such as those showing standard cross-sectional perspectives and those shown in the appended drawings. These terms are used for ease of reference but are not intended to be of limiting nature. These terms are therefore to be understood as referring to an optical device when in an orientation as shown in the accompanying drawings.

Although the invention has been described in terms of preferred embodiments as set forth above, it should be understood that these embodiments are illustrative only and that the claims are not limited to those embodiments. Those skilled in the art will be able to make modifications and alternatives in view of the disclosure which are contemplated as falling within the scope of the appended claims. Each feature disclosed or illustrated in the present specification may be incorporated in the invention, whether alone or in any appropriate combination with any other feature disclosed or illustrated herein.

The invention claimed is:

1. An optical stack, comprising:
a first substrate layer;
a second substrate layer;
an optical medium located between the first and second substrate layers;
wherein the first substrate layer and the second substrate layer are bent such that a second portion of the optical stack extends behind a first portion of the optical stack, each of the first portion and the second portion of the optical stack including a portion of the first substrate layer, a portion of the second substrate layer and a portion of the optical medium; and
further comprising one or more intermediate transparent layers between the first portion and the second portion of the optical stack, the first portion and the second portion forming adjacent portions of the optical stack, and wherein the first substrate layer and the second substrate layer are bent around the one or more intermediate transparent layers.

2. An optical stack according to claim 1, wherein the optical medium is liquid crystal layer.

3. An optical stack according to claim 1, wherein the first portion of the optical stack is substantially parallel to the second portion of the optical stack.

4. An optical stack according to claim 1, wherein each of the first portion of the optical stack and the second portion of the optical stack forms at least one of: an optical cell; a liquid crystal cell; or an organic photodiode.

5. The device of claim 1, comprising:
wherein the first portion of the optical stack forms a first lens, and
wherein the second portion of the optical stack forms a second lens, wherein the second lens is stacked on the first lens, and
wherein the first lens and the second lens are electrically switchable using the one or more connections.

6. An optical stack according to claim 1, wherein the first substrate layer is spaced from the second substrate layer in a first dimension and wherein the first portion of the optical stack is spaced from the second portion of the optical stack in the first dimension.

7. A display device or a sensor comprising the device of claim 1.

8. An optical stack according to claim 1, wherein the first substrate layer comprises an upper substrate layer of the first portion of the stack and a lower substrate layer of the second portion of the stack; and
wherein the second substrate layer comprises the lower substrate layer of the first portion of the stack and the upper substrate layer of the second portion of the stack.

9. An optical stack according to claim 1, wherein the first substrate layer and the second substrate layer are each bent at an angle of approximately 180°.

10. A virtual reality (VR) display device or 3-dimensional (3D) glasses comprising the device of claim 1.

11. An eyewear apparatus comprising two optical devices according to claim 1,
wherein the optical medium of each optical device comprises aligned domains, and wherein the domains of the optical medium of the first optical device are aligned in a first direction and the domains of the optical medium of the second optical device are aligned in a second direction; and/or
wherein each optical device of the eyewear apparatus has different optical properties.

12. The device of claim 1, wherein the one or more connections are configured for at least one of: switching the first portion of the optical stack and the second portion of the optical stack both at once; or
switching the first portion of the optical stack differently from the second portion of the optical stack.

13. An optical stack according to claim 1, wherein the one or more intermediate transparent layers includes an adhesive layer.

14. An optical stack according to claim 1, wherein the intermediate layer is located between a first portion of the second substrate layer and a second portion of the second substrate layer.

15. An optical stack according to claim 1, wherein the optical medium comprises aligned domains.

16. An optical stack according to claim 1, wherein the one or more intermediate transparent layers has a refractive index substantially the same as a refractive index of the optical medium.

17. An optical stack according to claim 1, wherein the optical device comprises at least four optical cells, and wherein each optical cell is parallel to each other optical cell, and wherein each optical cell extends behind an adjacent optical cell, and
wherein a first optical cell of the at least four optical cells comprises the first portion of the optical stack and wherein a second optical cell of the at least four optical cells comprises the second portion of the optical stack.

18. An optical stack according to claim 1, wherein the each of the first substrate layer and the second substrate layer are bent such that they have a corrugated shape.

19. An optical stack according to claim 1, wherein the first portion and the second portion of the optical stack each form an optical lens.

20. An optical stack according to claim 1, wherein the first substrate layer and the second substrate layer each comprises a plastic material.

21. A method of manufacturing an optical stack, the method comprising:
   forming a first substrate layer,
   forming a second substrate layer,
   forming an optical medium located between the first and second substrate layers;
   bending the first substrate layer and the second substrate layer such that a second portion of the optical stack extends behind a first portion of the optical stack, each of the first portion and the second portion of the optical stack including a portion of the first substrate layer, a portion of the second substrate layer and a portion of the optical medium; and
   forming one or more intermediate transparent layers between the first portion and the second portion of the optical stack, the first portion and the second portion forming adjacent portions of the optical stack, and wherein the first substrate layer and the second substrate layer are bent around the one or more intermediate transparent layers.

22. A method according to claim 21, wherein prior to bending the first substrate layer and the second substrate layer, the method further comprises:
   using a photolithography mask to align the optical medium within the first portion of the optical stack in a first direction, and
   using a photolithography mask to align the optical medium within the second portion of the optical stack in a second direction.

23. An optical stack comprising
   a first substrate layer;
   a second substrate layer; and
   an optical medium located between the first and second substrate layers;
   wherein the first substrate layer and the second substrate layer are bent such that a second portion of the optical stack extends behind a first portion of the optical stack, and wherein one or more of the first substrate layer and the second substrate layer comprise a single continuous substrate layer forming both the first portion and the second portion of the optical stack, and
   further comprising electrical connections coupled with the first substrate layer and the second substrate layer, and wherein the electrical connections are located on a single side of the optical stack.

24. An optical stack according to claim 23, wherein the electrical connections comprise Aluminium.

\* \* \* \* \*